(No Model.) 2 Sheets—Sheet 1.
E. L. DRAKE.
ICE CREAM FREEZER.
No. 407,064. Patented July 16, 1889.
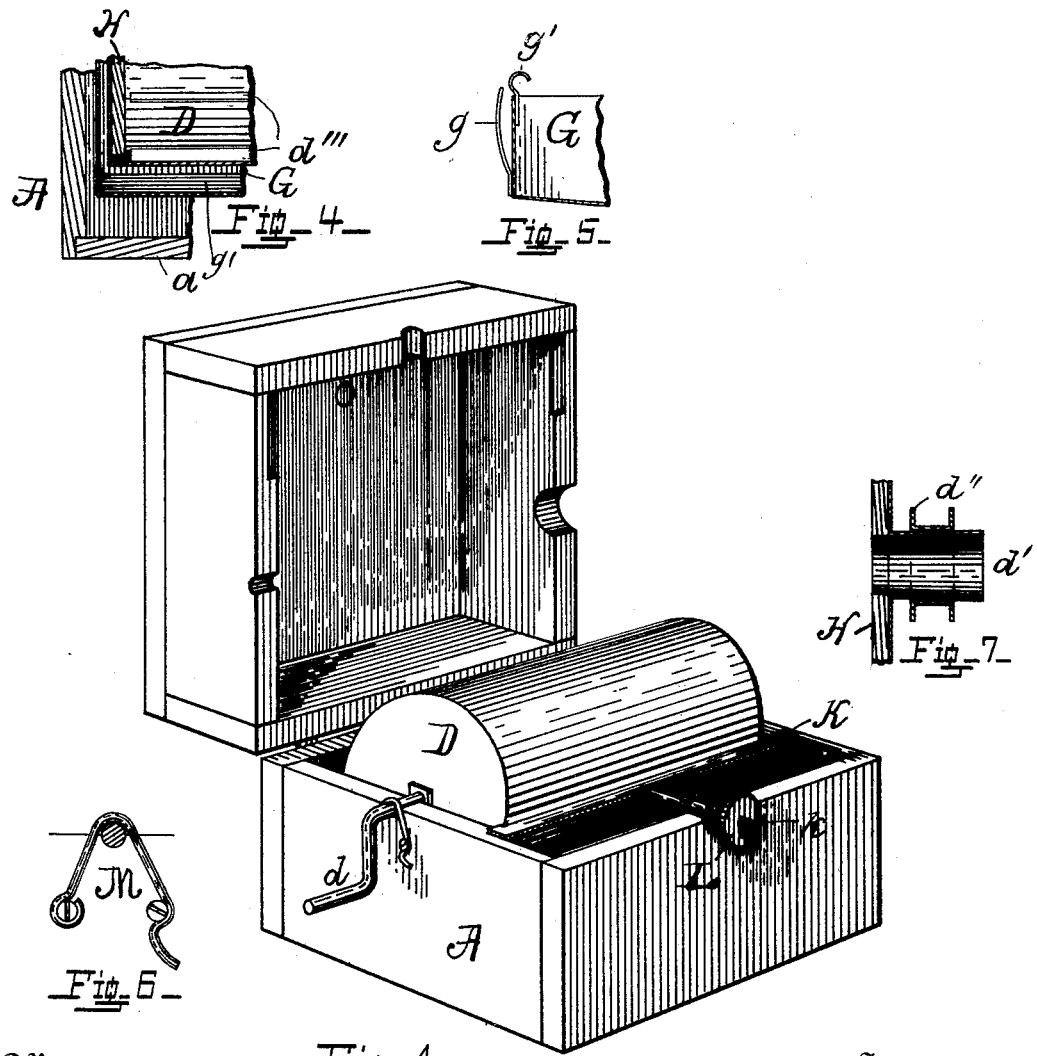
Witnesses
A. P. Wood
J. J. Sullivan
Inventor
Edwin L. Drake
By his Attorney
Albert A. Wood (No Model.) 2 Sheets—Sheet 2.
E. L. DRAKE.
ICE CREAM FREEZER.
No. 407,064. Patented July 16, 1889.
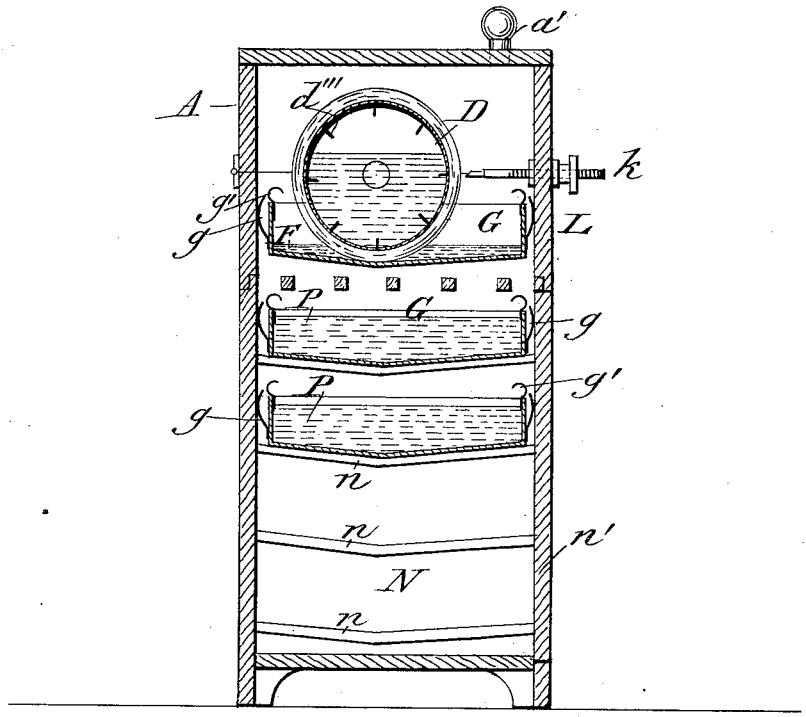
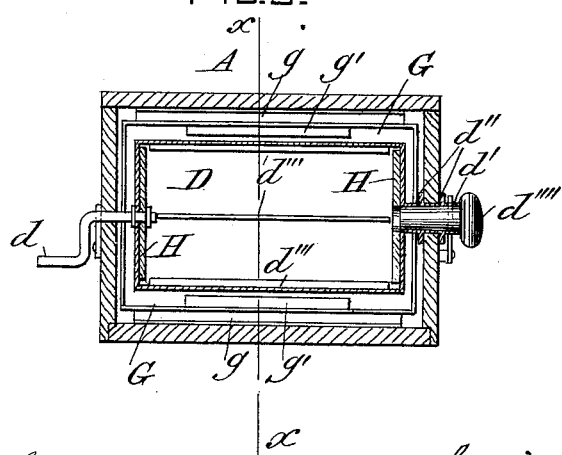
Attest
H. H. Schott
G. H. Burroughs.
Inventor
Edwin L. Drake
By Albert A. Wood
Atty

UNITED STATES PATENT OFFICE.

EDWIN L. DRAKE, OF WINCHESTER, TENNESSEE, ASSIGNOR OF ONE-HALF TO RUFUS W. SMITH, OF LA GRANGE, GEORGIA.

ICE-CREAM FREEZER.

SPECIFICATION forming part of Letters Patent No. 407,064, dated July 16, 1889.

Application filed September 21, 1888. Serial No. 286,015. (No model.)

*To all whom it may concern:*

Be it known that I, EDWIN L. DRAKE, a citizen of the United States, and a resident of Winchester, in the county of Franklin and State of Tennessee, have invented certain new and useful Improvements in Ice-Cream Freezers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to the class of refrigerating apparatus in which cream or other fluids are frozen by the use of ice and salt or other freezing-mixtures.

This invention consists of a revolving cylinder having non-conducting ends, a cream-containing pan provided with laterally-thrusting springs, whereby it is retained in a position below the cylinder, but depressible by the layer of frozen cream adhering to said cylinder as it gradually increases in thickness, and an adjustable knife adapted to clear the cylinder of the cream after it is frozen.

The above elements of the invention, as well as the details that will be necessary to put them into practical operation, will be fully set forth in this specification, and will be shown in the accompanying drawings.

In the accompanying drawings, Figure 1 is a perspective view of the device, showing nearly all of its details. Fig. 2 is a vertical section on the line $x$, Fig. 3, showing the cylinder containing the freezing-mixture, a coating of cream frozen on the outside of the cylinder, the pan containing the material to be frozen, the knife for removing the cream, and the places for storing the cream, with two pans of cream in their places. This figure also shows some other details not shown in Fig. 1. Fig. 3 is a vertical section central to the cylinder of all that portion of the device that is shown in Fig. 1, and showing also the contents of the cylinder and the pan. Fig. 4 is an enlarged sectional view of the contiguous parts of Fig. 3, not, however, showing the contents. Fig. 5 is an enlarged sectional view of one end of the pan and the springs by means of which it is held in position, and the handles by which it may be removed. Fig. 6 is an enlarged view of the latch by which the cylinder is held down when the cover is raised, as shown in Fig. 1, the reason for which will be hereinafter explained. Fig. 7 is an enlarged view of the tube by which the freezing-mixture is charged into the cylinder, showing also the flanged ring that forms the journal for that end of the cylinder.

In the figures, like reference-marks indicating corresponding parts in the several views, A is a box in two parts, (best shown in Fig. 1,) having a removable bottom $a$, as shown in Fig. 3. With the bottom $a$ removed the box may be placed on and form a part of a refrigerating-chamber C, as shown in Fig. 2. The cylinder D, having a crank $d$, is journaled on the box A, as shown in Figs. 1 and 3, one of the journals being formed on the tube $d'$ by having around it the flanged ring $d''$. The cylinder has on its inner side the flanges $d'''$, which are best shown and are marked in Fig. 4, to stir the freezing-mixture and prevent a settling of the heavier elements that it contains. This cylinder, before being put into the apparatus, may be filled with the freezing-mixture of such a strength and such a quantity as will accomplish the desired amount of refrigeration, the quantity being otherwise immaterial, as it will remain in the bottom and in contact with the same part of the cylinder as is the material F, from which it is to extract the heat. The cream F is placed in the pan G, which is supported in the box A by the friction of the springs $g$, the hooks $g'$ being provided for the purpose of lifting it out and in. The plug $a'$ fits in a hole through the top of the box, through which the liquid cream may be charged into the pan without opening the box. The plug also serves to support the cover when turned back.

I will now describe the operation of the parts just mentioned.

The cream F or other fluid to be frozen is placed in the pan G and the pan is forced into the box A, the resistance being the springs g. The cylinder, standing on the crank end, is charged through the tube d' with the required quantity of the freezing-mixture, and the plug d'''' is inserted to prevent the escape of the mixture. The cylinder is then placed in the box, with the pan-bottom resting against it, when the cover should be closed and the cylinder be turned by its crank. The turning of the crank will mix the material thoroughly, and if the ingredients of which it is composed are of a different specific gravity, like ice and salt, will prevent them from separating, which would lessen its frigorific action. Consequently a better result is obtained by agitating the freezing-mixture in a horizontal cylinder like that described than can be obtained from the cylinder in any other position, with the additional advantage of having the cylinder from end to end in a condition to absorb an equal amount of heat. On turning the cylinder, as the latent heat is absorbed from the material in the pan it forms an accretion on the cylinder and forces the pan downwardly as it forms, thus keeping the pan-bottom in constant contact with the freezing cream and producing a "smooth" and perfect product. On account of the agitation and thorough and constant mixing of the elements of the freezing-mixture it absorbs heat very rapidly, and will soon reduce the temperature of the liquid cream in the pan to 32°, after which, by absorption of its latent heat, the cream adhering to the cylinder will be congealed and form on the cylinder until it shall have taken up and solidified the whole of the contents of the pan. For the purpose of preventing a formation on the ends of the cylinder false wooden or other non-conducting heads H are placed on the inner side of the cylinder-heads proper, the cylinder being preferably made from thin sheet metal, as being the most practical material for that purpose. The metal heads may, however, be omitted and peripheral portion of the cylinder be attached directly to the wooden heads, the object being to prevent a sufficient transmission of heat to cause congelation to take place on the cylinder-heads.

The process as above described will cause the product to be entirely free from liquid cream, and it is found to keep much longer than that frozen by any other known process, and in that condition may be cut off of the cylinder in blocks, or be cut off of the cylinder by the knife K. (Shown in Figs. 1 and 2.) The knife K slides in a recess at each of its ends formed in the joints of the box, as shown in Fig. 1, and is forced up for this purpose by turning the nut L, that is journaled in the edges of the two parts of the box, a screw-thread being cut on the stem $k$ and a corresponding one in the nut. It is preferable to have the cutting-edge on the bottom side of this knife, as the cream is more readily discharged from it into the pan; but it will be observed by reference to Fig. 1 that the knife may be readily taken out and turned over and the cutting be done on the top of the knife, in which case, as it is usually done with the cover up, the latches M, (best shown in Fig. 6,) one of which is on each end of the cylinder, will hold the cylinder down. These latches are also useful in holding the cylinder down against the resistance of the pan as the cream forms on the cylinder, making it unnecessary to fasten the cover down or even to have it closed. The knife K may, if desired, be kept nearly in contact with the cylinder, the edge of the knife being turned against the direction of the revolution, when it will shave the cream off of the cylinder as formed, making it of any desired consistence and of remarkable "smoothness."

The apparatus may be used as shown in Figs. 1 and 3 when it is desired to make such a quantity only as can be frozen at one time; but when a greater quantity is to be made the bottom $a$, Fig. 3, should be removed and the balance of the apparatus be attached to the refrigerating-chamber N, as shown in Fig. 2. In this refrigerating-chamber are the brackets $n$, on which pans of frozen cream P may be placed, or the pans may contain liquid cream to be cooled preparatory to the subsequent freezing. A door $n'$ is provided by which to have access to this chamber.

I have described this device as an ice-cream freezer. It may, however, be used for other purposes without a departure from the spirit of the invention—that is to say, nitrate of ammonia or other freezing agents may be employed in the cylinder and water be frozen on the outside and be melted by the reabsorption of heat from the chamber M, which might be used for refrigerating any article placed therein.

Having thus described my invention, what I claim as new, and desire to secure by Letters Patent of the United States, is—

1. In an ice-cream freezer, a revolving cylinder having non-conducting ends, in combination with a cream-containing pan provided with laterally-thrusting springs, whereby it is retained in position below the cylinder, but depressible by the layer of cream as it gradually increases in thickness on the cylinder, substantially as set forth.

2. In an ice-cream freezer, a revolving cylinder having its ends formed of non-conducting material, in combination with a cream-containing pan provided with laterally-thrusting springs, whereby it is retained in position below the cylinder, but depressible by the layer of cream as it gradually increases in thickness on the cylinder, the chamber inclosing said cylinder and pan, and the adjustable knife attached to the side of said
5 chamber so that its edge can be brought to bear upon the surface of the cylinder to clear it of the frozen cream, substantially as set forth.

In testimony whereof I hereunto affix my signature in presence of two witnesses.

EDWIN L. DRAKE.

Witnesses:
E. B. SMITH,
R. W. SMITH.